No. 792,604. PATENTED JUNE 20, 1905.
W. D. MASSENGILL.
FRICTION CLUTCH FOR PULLEYS.
APPLICATION FILED APR. 12, 1904.
2 SHEETS—SHEET 1.
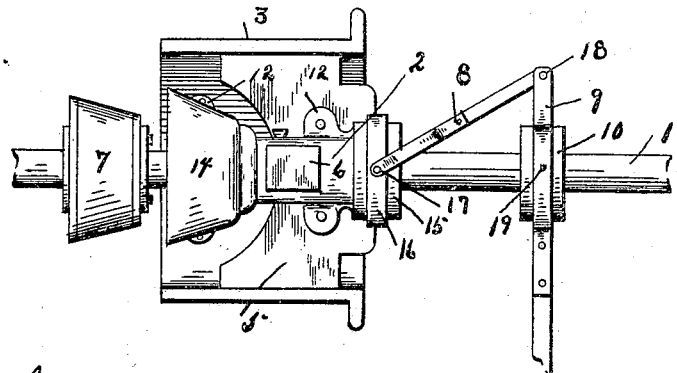
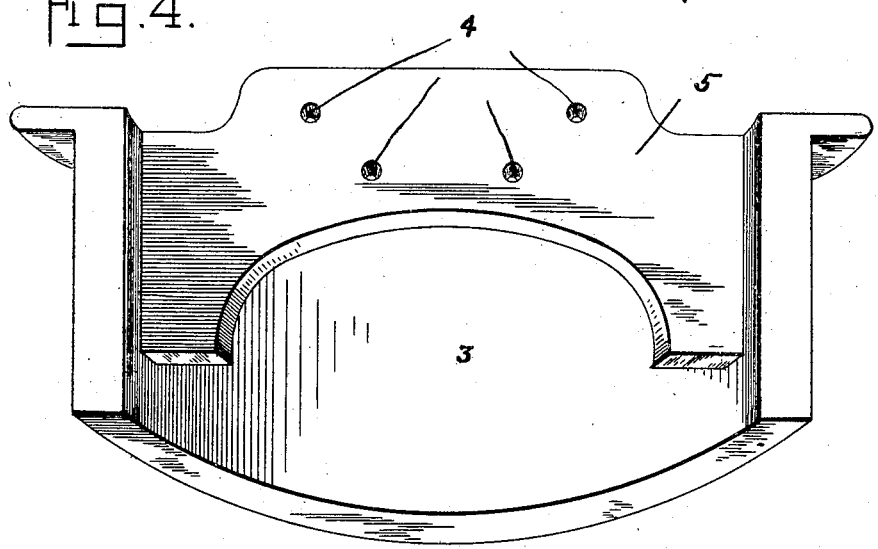
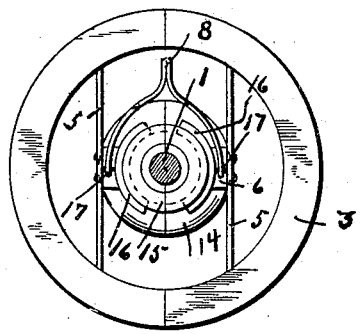
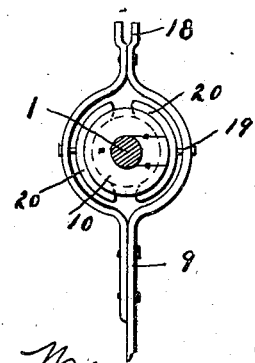
Witnesses
Inventor
William Douglas Massengill
by Watson E. Coleman
Attorney

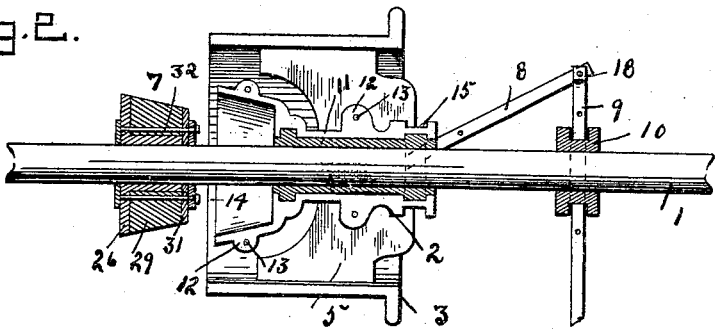
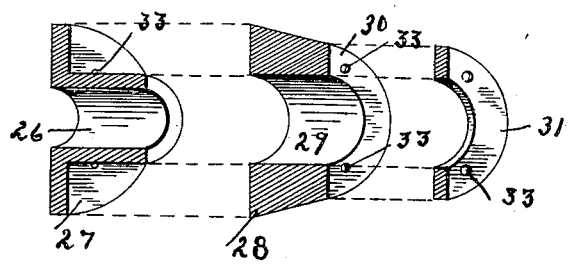
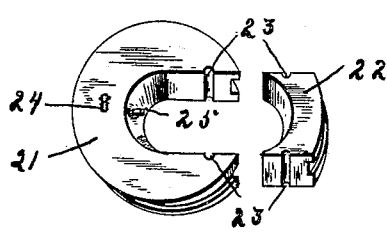
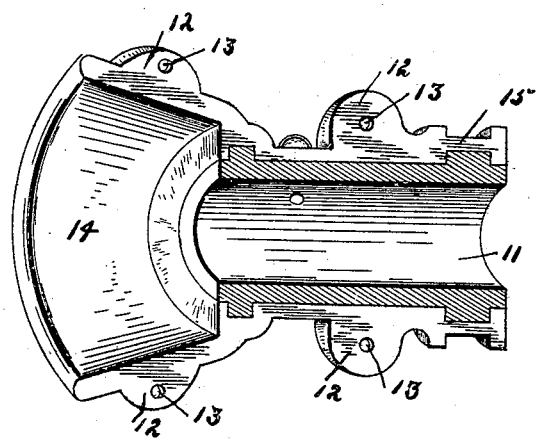

No. 792,604.

Patented June 20, 1905.

UNITED STATES PATENT OFFICE.

WILLIAM DOUGLAS MASSENGILL, OF MERCER, TENNESSEE.

FRICTION-CLUTCH FOR PULLEYS.

SPECIFICATION forming part of Letters Patent No. 792,604, dated June 20, 1905.

Application filed April 12, 1904. Serial No. 202,808.

*To all whom it may concern:*

Be it known that I, WILLIAM DOUGLAS MASSENGILL, a citizen of the United States, residing at Mercer, in the county of Madison and State of Tennessee, have invented certain new and useful Improvements in Friction-Clutches for Pulleys, of which the following is a specification, reference being had therein to the accompanying drawings.

My invention relates to improvements in friction-clutches for pulleys, and has for its object the providing of a clutch of the character described that shall be simple and effective in construction and operation and by the use of which much saving of time and wear and tear on belts can be effected, inasmuch as the use of my device obviates the necessity of slowing up or stopping the engine when it becomes necessary to put on belts.

A further object of my invention is to provide a device of the character described that will result in the work of shifting or changing belts being reduced to a minimum and one that shall be simple and easy of operation.

The invention consists in the novel construction, combination, and arrangement of the several parts hereinafter fully described, illustrated, and finally claimed.

In the drawings accompanying this specification and made a part hereof I have illustrated a preferred embodiment of my invention, and while it is obvious that certain modifications of form and arrangement of parts will suggest themselves to the skilled operator and mechanic such modifications come well within the spirit and scope of my invention as disclosed and claimed, and I do not, therefore, desire to be limited to the precise construction and arrangement shown.

In the drawings, Figure 1 is a front elevation with pulley broken away. Fig. 2 is a longitudinal section through the entire apparatus. Fig. 3 is a section on line 3 3 of Fig. 1. Fig. 4 is a perspective section of the pulley. Fig. 5 is an end view of collar 10 and lever 9. Fig. 6 is a perspective sectional view of the paper-friction shown in parts. Fig. 7 is a perspective view of the collar 10. Fig. 8 is a section of the main casting.

Like numerals of reference designate similar parts in all the figures of the drawings.

1 designates the shaft, upon which the main casting 2 is suitably journaled in bearings. This casting is arranged inside of the pulley 3 and is held in place by means of bolts passing through the holes 4 in the partitions 5, the bolts serving to hold the said partitions firmly against the flattened projection or lug 6 on the casting. Near one end of the casting 2 and rigidly mounted on the shaft 1 is a cone-shaped paper-friction-hub arrangement 7, and secured to the other end of the casting is a forked lever 8, having its outer end pivoted on a yoke-lever 9, which is mounted on a collar 10, mounted on the shaft 1. Fig. 8 shows clearly the construction of the main casting. This casting is preferably formed in two parts and is provided with a brass bearing 11 and with projections 12, having holes 13 therethrough for the reception of bolts or other suitable means for fastening the parts together. One end of this casting is cone-shaped, as shown at 14, and engages with the paper-friction apparatus 7, and on the other end is formed a collar 15, arranged to receive the two curved pieces 16, which are pivoted, as shown at 17, on the forks of the lever 8. The other end of this lever is pivoted in the fork 18 on the lever 9. Pivoted in the yoke of the lever 9, as shown at 19, are two curved pieces 20, which bear in collar 10. This collar is preferably formed in two parts 21 and 22, which are connected by bolts passing through the holes 23. In order to securely fasten the collar 10 to the shaft, a set-screw 24 is provided, which acts on the case-hardened pin 25 and rigidly secures said collar to the shaft.

In Fig. 6 the several parts comprising the paper-friction-hub apparatus are shown. On the shaft 1 a collar 26 is mounted. This collar is provided with a flange 27, against which rests the end 28 of the cone-shaped paper-friction 29. Secured to the smaller end 30 is the end piece 31, all of the parts being held in place by bolts 32, which pass through the holes 33 shown appearing in each part.

In operation the lever 9 is pushed to one side, causing the lever 8 to move the entire pulley and casting until the cone-shaped end 14 engages with the paper-friction hub or apparatus 7, which causes the pulley to rotate on the shaft 1. To throw the pulley out of action, the lever 9 is pushed in the opposite direction, causing the lever 8 to throw the casting out of contact with the friction-hub 7.

Having thus described my said invention, what I claim as new, and desire to secure by Letters Patent of the United States, is—

1. In a friction-clutch, a cone-shaped sleeve, a pulley-wheel mounted on the sleeve, a collar on the sleeve, a forked link, curved pieces pivoted within the forks and arranged to ride on the collar, a separate collar, a yoke-lever, curved pieces pivoted within the yoke and arranged to ride the separate collar, means for pivotally connecting the lever and the forked link, and a cone-shaped friction-hub comprised of three pieces, substantially as described.

2. In a cone friction-clutch, a sleeve having a cone-shaped end, and a collar, a separate collar, a lever having a yoke, curved pieces fitting within the yoke and arranged to fit and ride on the collar, and a forked link connecting the lever with the collar on the end of the sleeve, and a cone-shaped friction-hub formed in three pieces, substantially as described.

3. In a friction-clutch, a casting formed in two pieces and having a cone-shaped end, a pulley-wheel mounted on the casting, means for connecting the two pieces of the casting, a collar on the end of the casting, a collar separate from the casting, a forked lever having curved pieces pivoted on the forks and arranged to fit the separate collar, a link forked at one end and having curved pieces pivoted on the forks and fitting on the collar on the end of the casting, said link having the other end pivoted on the lever, and a cone-shaped friction-hub formed in three pieces, substantially as described.

4. In a friction-clutch, the combination of a casting formed in two pieces and having a cone-shaped end, means for connecting the two pieces of the casting, a collar on the end of the casting, a separate collar, a yoked lever, two curved pieces arranged to fit the separate collar and ride thereon, means for pivoting the two curved pieces to the yoked lever, a forked lever pivoted at one end on the lever, and two curved pieces arranged to fit and ride on the collar on the end of the casting and having the forks of the lever pivoted thereon, substantially as described.

In testimony whereof I hereunto affix my signature in presence of two witnesses.

WILLIAM DOUGLAS MASSENGILL.

Witnesses:
T. E. MERCER,
M. J. SILER.